(12) United States Patent
Blakelock et al.

(10) Patent No.: US 6,453,540 B1
(45) Date of Patent: Sep. 24, 2002

(54) TOOL FOR THE INSTALLATION OF A TERMINAL STUD ADAPTER IN A GENERATOR ROTOR AND METHODS THEREFOR

(75) Inventors: Thomas Richard Blakelock, Clifton Park, NY (US); Jeffrey Donald Evans, Scotia, NY (US); Leonard Paul Squillacioti, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 09/741,831

(22) Filed: Dec. 22, 2000

(51) Int. Cl.[7] ................................................ H02K 15/10
(52) U.S. Cl. ............................ 29/598; 29/732; 29/735; 29/857; 29/868; 439/843; 439/801
(58) Field of Search ....................... 29/598, 732, 735, 29/857, 868; 439/843, 801

(56) References Cited

U.S. PATENT DOCUMENTS

| | | | | |
|---|---|---|---|---|
| 3,840,964 A | * | 10/1974 | Long, Jr. ..................... | 227/86 |
| 5,122,696 A | * | 6/1992 | Shih et al. ................... | 310/270 |
| 5,358,432 A | * | 10/1994 | Shih et al. ................... | 439/655 |
| 6,280,265 B1 | * | 8/2001 | Hopeck et al. ............... | 310/71 |
| 6,347,968 B1 | * | 2/2002 | Hamilton ..................... | 439/801 |

* cited by examiner

*Primary Examiner*—Charles G. Freay
*Assistant Examiner*—Emmanuel Sayoc
(74) *Attorney, Agent, or Firm*—Nixon & Vanderhye

(57) ABSTRACT

A method of inserting a terminal stud adapter section of a terminal stud into the radial bore of a rotor, involving a tool, which includes an elongated tool body having a head at one end from which a pair of pins project. The head is preferably plated with copper. The head is received in the recess of a stud adapter section with the pins engaging in apertures in the adapter section. By inserting the adapter section in the radial bore of a rotor, the adapter section can be threaded to the bore copper. Upon removal of the tool from the recess of the adapter section, an outer section of the terminal stud is received within the radial bore and an inner end thereof makes electrical connection with the adapter section.

5 Claims, 4 Drawing Sheets

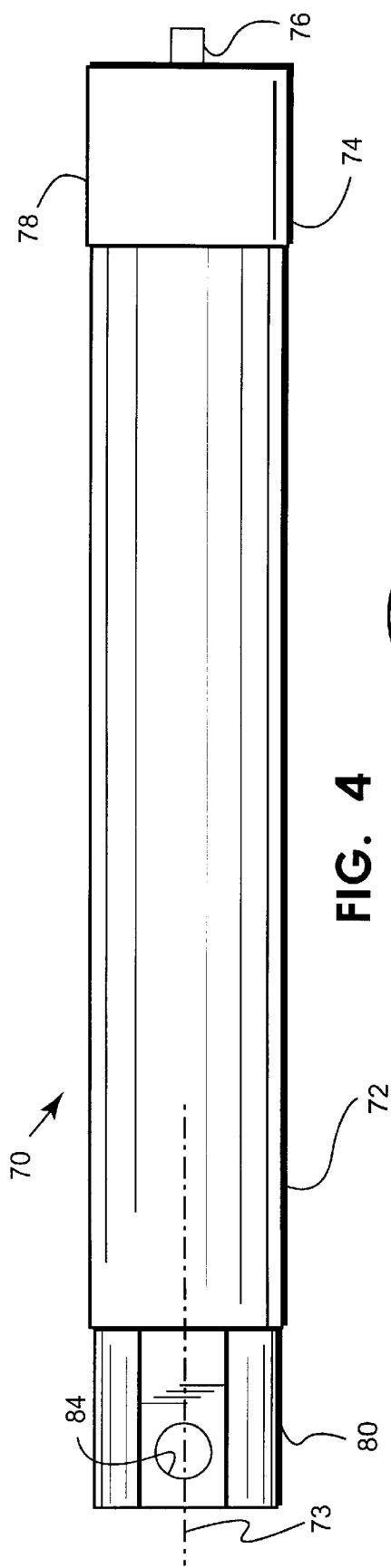
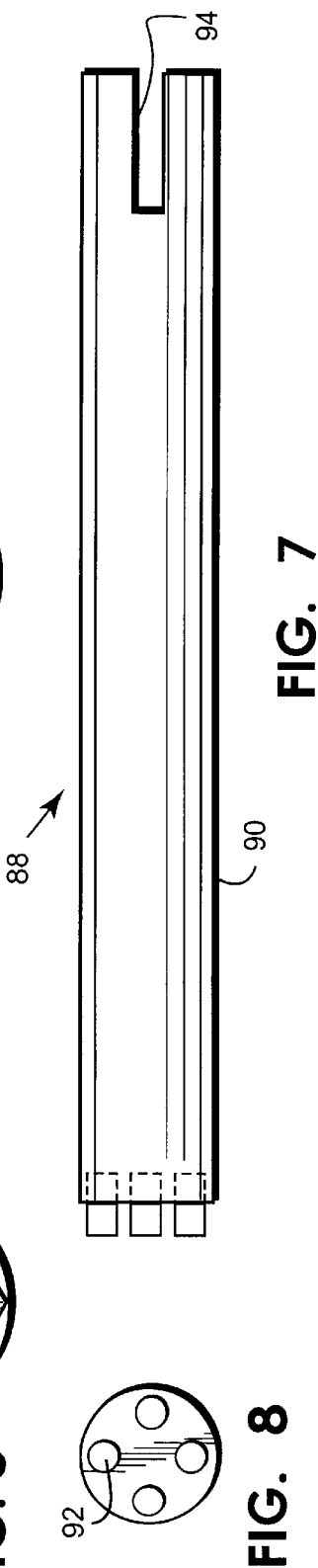
FIG. 4
FIG. 5
FIG. 6
FIG. 7
FIG. 8

TOOL FOR THE INSTALLATION OF A TERMINAL STUD ADAPTER IN A GENERATOR ROTOR AND METHODS THEREFOR

BACKGROUND OF THE INVENTION

The present invention relates to a tool for installation of a terminal stud adapter in a generator rotor to effect an electrical connection between field windings and exciter or slip rings and particularly relates to a tool for and methods of installing a terminal stud adapter section of a sectional terminal stud, either as an original equipment manufacture or as a retrofit in a dynamoelectric machine.

The rotors of dynamoelectric machines typically. comprise relatively large diameter cylindrical bodies containing field windings for producing magnetic flux which in turn produces stator current and voltage. These field windings are normally carried in a series of longitudinal slots along the outer circumference and extend the length of the rotor body. Rotation of the body particularly at speeds of 3600 rpm, for example, exerts high centrifugal forces on the windings. These windings are conventionally retained in the rotor slots through the use of dovetail shaped wedges which also extend along the length of the rotor body. The manner in which the windings and rotor slots are shaped, insulated and cooled present formidable design problems, particularly for units designed for long term operation under variable load and environmental conditions. Because the windings extend axially beyond the rotor body and wedge ends and are subjected to the same rotational forces which tend to thrust the winding end turns in a radially outward direction, specially designed structure must be included to make electrical connections between the exciter or slip rings and the windings.

In a current long-standing design affording electrical connection between a field winding and a bore conductor (see, for example, U.S. Pat. No. 5,358,432), a main terminal, i.e., a terminal stud, is inserted into a radial bore of the rotor. The main terminal has tapered threads at its radial inner end for engaging female tapered threads in the bore connector, also known as the "bore copper" (insulated conductors embedded in small diameter shafts that extend from opposite ends of the rotor body for electrical connection with the exciter/rectifier assembly). Tolerances of the taper angle, thread pitch, the contacts along major and minor threaded diameters and the need to torque the main terminal to a predetermined value render the installation of the main terminal to bore connector connection difficult as well as affording less than optimal conditions for good electrical connection. The opposite end (radially outer end) of the main terminal includes a plurality of flexible, preferably copper, leaves which are electrically connected to the field winding. Because of the pipe thread type securement between the main terminal and bore connector, the thin terminal leaves are necessarily formed and brazed together at their ends and to the field windings at the generator site. In that process, care must be taken not to melt the necessary thin copper leaves or to allow the brazing alloy to migrate into the flexible part of the terminal. Field brazing of the leaves to one another and to the field winding is time consuming and laborious. Should the leaves melt in the course of brazing or should braze alloy migrate to the flexible part of the terminal, the high rotational and thermal forces of the rotor will cause the flexible connection to prematurely fail causing unscheduled outages and generator down time.

In a companion application of assignee hereof Ser. No. 09/741,160, the disclosure of which is incorporated herein by reference), there is disclosed apparatus and methods for retrofitting generators in the field without the need for remanufacturing or removal of the bore connector from the center of the rotor. To accomplish this, there is provided a sectional main terminal or terminal stud including a radially inner stud adapter section and an outer terminal stud section. The adapter section has on its radially inner end a radially inner, male threaded portion to match the female threaded portion of the existing bore copper, whereby the stud adapter section can be threaded into the bore copper in the field. However, the stud adapter section requires installation at the base of the radial bore of the rotor, the radial bore being less than one and one-half diameters greater than the adapter section and four times longer than the adapter section. Additionally, the adapter section is constructed of a softer material, i.e., copper, than that of the walls of the radial bore and has coated threads, preferably silver-coated, to form a good electrical connection. These threads should not be marred or scraped during installation. Further, the adapter section at the base of the radial bore requires engagement and tightening to a predetermined torque value to afford good electrical connection. The opposite end of the adapter section from the male threads includes a recess for receiving an annular spring-like electrical connector. The outer section includes a radial inner end receivable within the annular spring connector to afford good electrical connection between the outer and adapter sections of the terminal stud. The opposite end of the outer section includes the leaf copper for connection to the field windings. With that arrangement, however, there is a need for a tool to facilitate installation of the terminal stud adapter section both as original equipment in the field as well as a method of installing the sectional terminal stud into the radial bore of the rotor.

BRIEF SUMMARY OF THE INVENTION

In accordance with a preferred embodiment of the present invention, there is provided a tool for inserting and removing the terminal stud adapter section, either as original equipment or in the field, such that the stud adapter section can be threaded to the female threaded aperture of the bore copper at the base of the radial bore of the rotor. To accomplish this, there is provided an elongated, generally cylindrical tool, preferably formed of steel, having at one end a pair of pins projecting from an end face and lying on a diameter. A layer of copper material is disposed about the one end of the tool adjacent the pins. The copper-layered end of the tool is sized and configured for reception in the recess of the adapter section with the pins in apertures at the base of the recess such that the adapter section can be frictionally retained on the end of the tool. The opposite end of the tool may have a head specifically configured for engagement by a driving tool. For example, the head may comprise a series of flat surfaces, e.g., a hex head, for receiving a wrench. Alternatively, a diametrical hole or a longitudinal slot may be provided in the head to accommodate a driving member in the form of a rod and a screwdriver, respectively.

To use the tool, the sectional terminal stud may be deployed as part of original equipment or as a retrofit into existing generators in the field. The rotor end cap and field windings are either not assembled as the case of original equipment or are removed prior to installation of the stud adapter section during a retrofit. For a retrofit, the existing one-piece terminal stud is unthreaded from the female threads of the bore copper and removed. To install the adapter section, one end of the tool is inserted into the recess of the adapter section in frictional engagement with the multi-contact-electrical connector which exerts a bias against the tool whereby the adapter section is frictionally retained on the end of the tool. The adapter section and tool.are then inserted into the bore copper. The driving member is then applied to the driving head of the tool to thread the adapter section onto the female threads of the bore copper. Once the adapter section has been torqued down to a predetermined value, the tool is withdrawn from the recess of the adapter section and the outer section of the terminal stud is inserted into the bore with its inner end received in the recess in electrical contact with the multi-contact-electrical connector. A male threaded nut is threaded into the radial bore of the rotor to maintain the sectional terminal stud in place.

In a preferred embodiment according to the present invention, there is provided a tool for inserting a terminal stud adapter section in a generally radially extending bore hole in the rotor of a dynamoelectric machine for connection to a bore copper, the stud adapter section having a plurality of off-axis apertures opening through one end thereof, comprising an elongated tool body having an axis, a pair of pins projecting from one end of the tool body and spaced from the axis thereof for reception in the spaced apertures of the stud adapter section, a tool head adjacent an opposite end of the tool body for engagement by a drive member for rotating the tool body about the axis and a layer of a material about one end thereof for engaging the stud adapter section and preventing galling thereof.

In a further preferred embodiment according to the present invention, there is provided a method of inserting an adapter section of a sectional terminal stud into the radial bore of a dynamoelectric machine having a rotor, a bore connector extending generally in an axial direction along a portion of the rotor and having a generally radially outwardly opening aperture, the terminal stud including an outer section, the stud adapter section having a male projection at one end and a recess at an opposite end and a flexible electrical connector in the recess, comprising the steps of (a) disposing an end of an elongated tool into the recess into engagement with the electrical connector to frictionally retain the stud adapter section on the end of the tool, (b) inserting the stud adapter section into the radial bore of the rotor to engage the male projection thereof in the aperture of the bore connector and (c) withdrawing the tool from within the recess of the stud adapter section and the radial bore, leaving the stud adapter section engaged with the bore connector.

BRIEF DESCRIPTION OF THE DRAWINGS

FIG. 4 is a side elevational view of a tool constructed in accordance with a preferred embodiment of the present invention for use in coupling the stud adapter section to the bore copper;

FIG. 5 is a left end elevational view thereof;

FIG. 6 is a right end elevational view thereof;

FIG. 7 is a view similar to FIG. 4 illustrating a further embodiment of the tool hereof; and FIG. 8 is an end elevational view thereof.

DETAILED DESCRIPTION OF THE INVENTION

Figure 1:
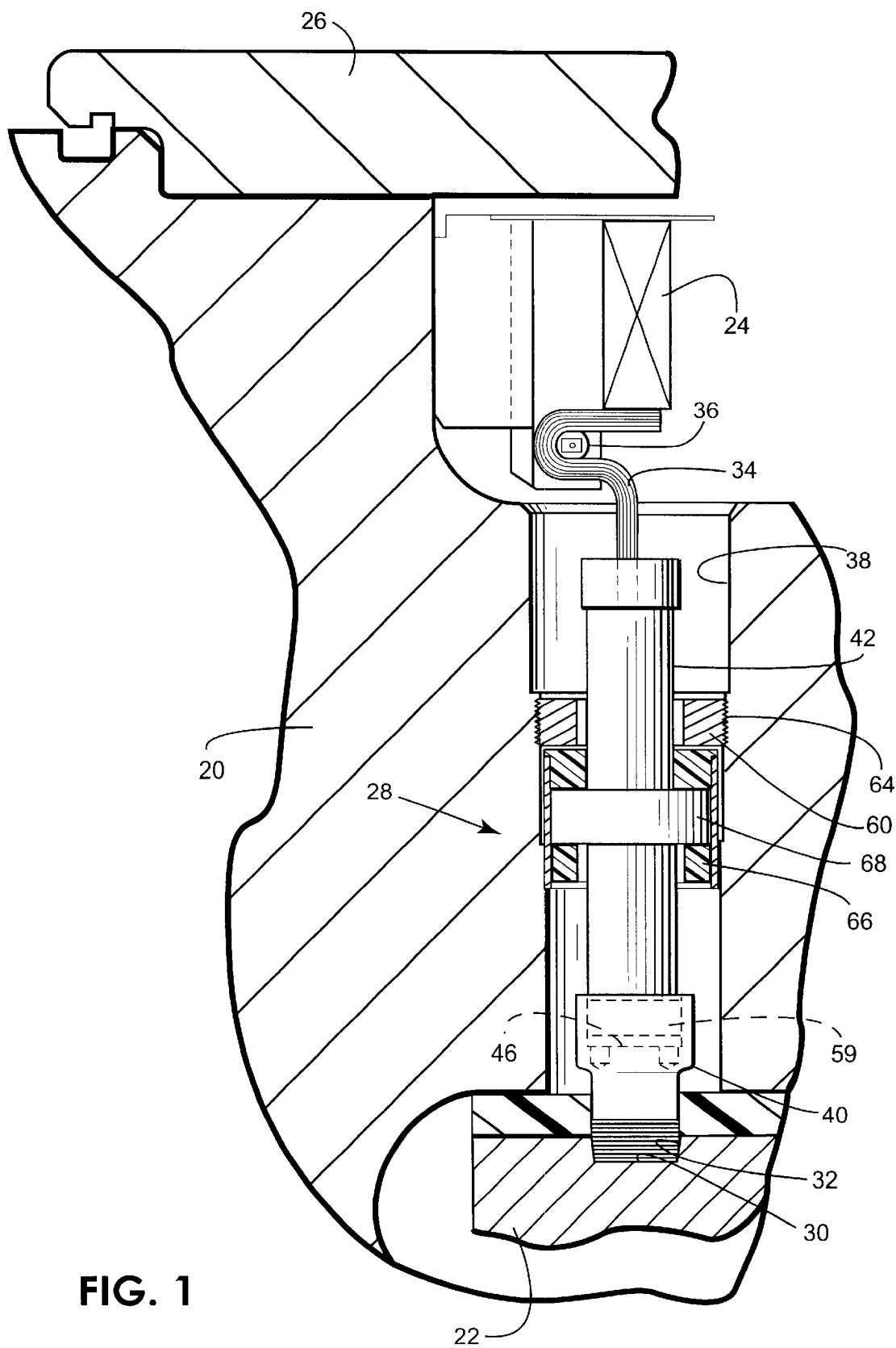
FIG. 1 is an enlarged fragmentary side elevational view with portions broken out and in cross-section of a radial bore of a generator rotor illustrating an installed sectioned terminal stud electrically connecting the field windings and bore copper of the generator.
Figure 2:
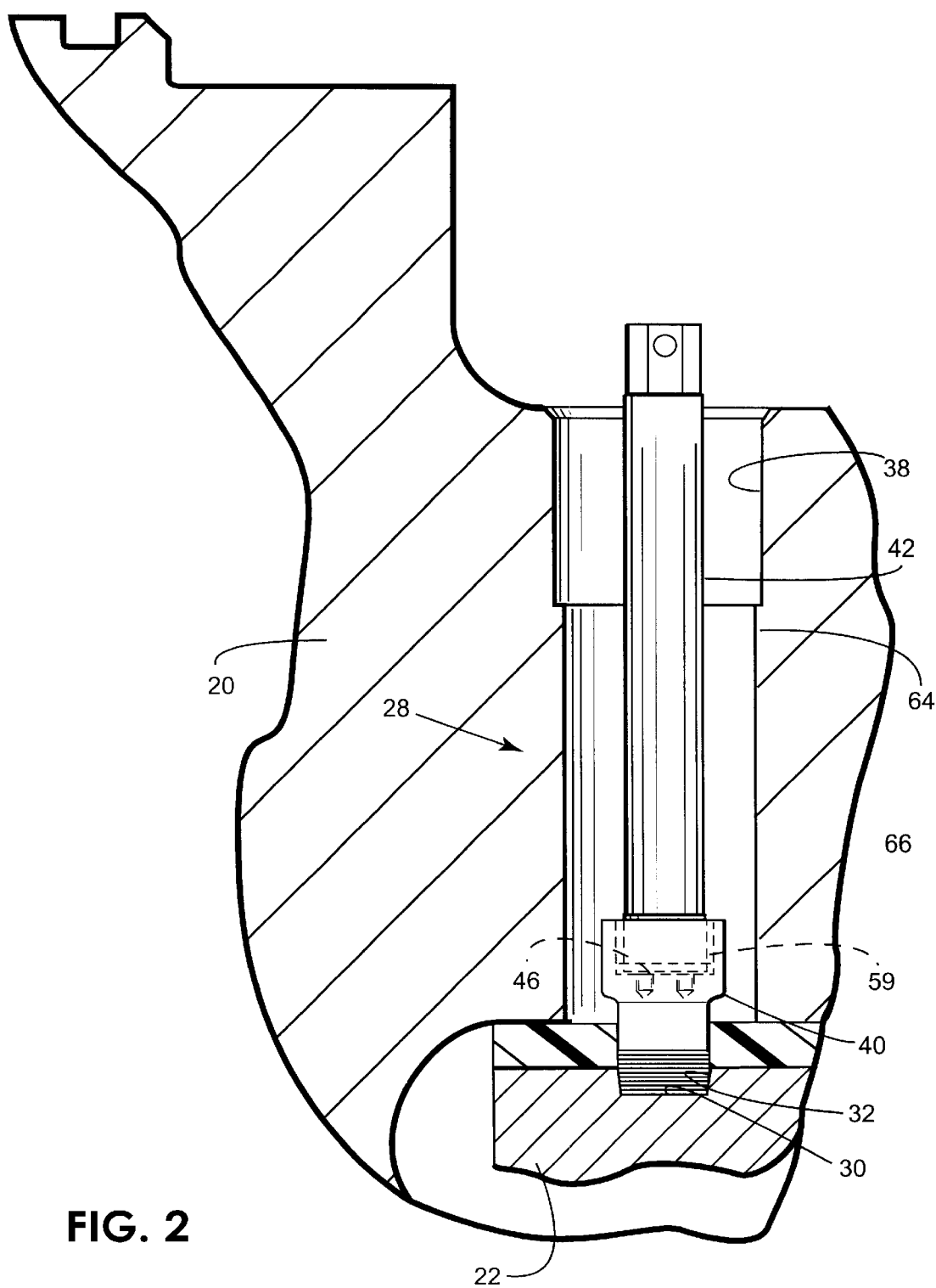
FIG. 2 is a view similar to FIG. 1 illustrating the installation of the stud adapter section to the bore copper with a tool constructed in accordance with the present invention.

Referring to the drawings, particularly to FIG. 1, there is illustrated a completely assembled sectional terminal stud interconnecting the field windings and a bore copper as part either of an original equipment manufacture or a retrofit for an existing generator. Particularly, there is illustrated a generator rotor 20, a bore copper 22 extending generally parallel to the axis of the rotor 20, end turns 24, a retaining ring 26 and a sectional terminal stud, generally designated 28, electrically interconnecting the bore copper 22 and end turns 24. As set forth in the above-referenced co-pending application, the bore copper 22 has a radially opening aperture 30 containing a female tapered thread 32. The sectional terminal stud 28 is screwthreaded into the bore copper 22 at one end and has a shaped leaf connector 34, i.e., leaf copper, for electrically connecting with end turns 24 at its opposite end. As well known, the leaf connector 34 comprises a plurality of leaves of copper brazed at opposite ends but loose between opposite ends. In this instance, the leaf connector 34 is turned about a pin support 36.

Figure 3:
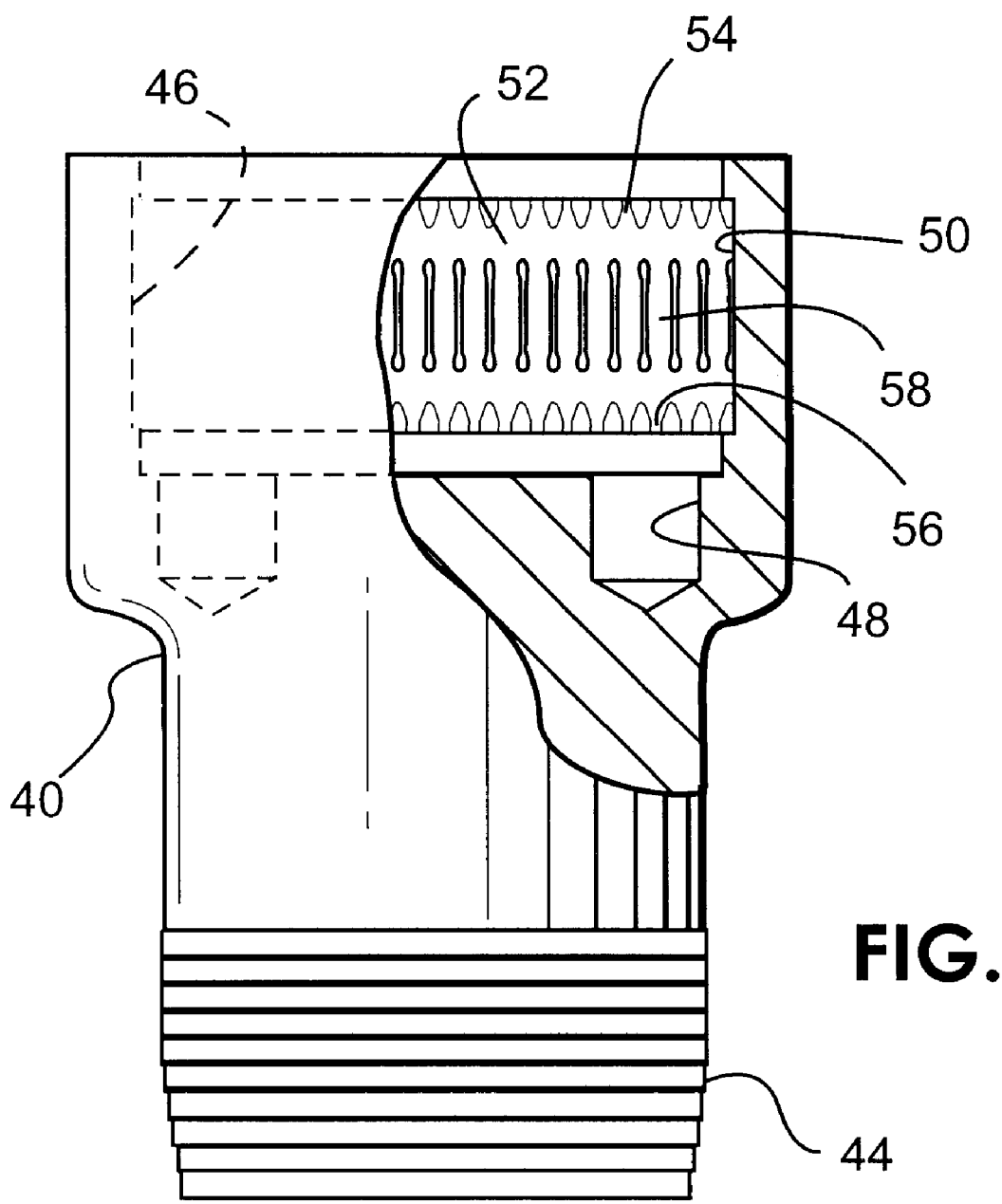
FIG. 3 is an enlarged side elevational view with portions broken out and in cross-section of the adapter section forming part of the sectional terminal stud.

One of the principal advantages of the sectional terminal stud as disclosed in the above-identified prior application is that the terminal stud does not require rotational orientation in the radial bore 38 of the rotor as outlined below. The sectional terminal stud 28 includes a radial inner stud adapter section 40 and an outer section 42. As best illustrated in FIG. 3, the adapter section 40 includes tapered male threads 44 on a radially innermost end thereof for threaded engagement with female threads 32 of the bore copper 22. These threads 44 are preferably silver-coated to afford good electrical connection with the bore copper 22. The radial outer end of the adapter section 40 is diametrically enlarged to provide a recess 46 opening radially outwardly. The base of the recess includes a pair of apertures 48 for receiving the projections on the end of a tool, for example, the tool of FIG. 4 hereof, whereby the adapter section 40 can be screwthreaded into the bore copper 22 as described below. The recess 46 includes an enlarged interior diameter section 50 for receiving a springbiased multi-contact connection strip or electrical connector 52. The strip 52 is commercially available and comprises an electrical connector having marginal or peripheral bands 54 and 56 with spring levers 58 therebetween. The margins 54 and 56 extend radially inwardly of the recess 46 for purposes of forming an electrical connection with the radial inner end of the outer terminal stud section 42. The electrical connector 52 is retained within the enlarged recess 50 and the spring louvers 58 form an electrical connection with the adapter section 40.

The outer section 42 is sized at its radially inner end portion 59 for reception in the recess 46 in electrical contact with the electrical connector 52. It will be appreciated that the electrical contact portion 59. of the outer section 42 is inserted into the recess 56 without regard to rotational orientation of the outer section 42 about the axis of the terminal stud 28. It will also be appreciated that the leaf copper 34 may be formed on the upper end of the outer terminal stud section 42 prior to its installation into the radial bore 38. The outer stud section 42 is retained in the radial bore by a retainer or nut 60 having external threads 64. The external threads 64 engage female threads on the radial bore 38. The outer section 42 in the region of the nut 60 is electrically insulated from the nut. Additionally, annular insulators 66 are provided on opposite sides of the enlarged intermediate portion 68 of the outer section 42. Consequently, when the outer section is inserted into the radial bore 38 and the nut 60 is threaded to engage the threaded portion of the bore, the outer section 42 is maintained in the radial bore 38 in electrical contact with the adapter section 40 and electrically insulated from the rotor.

Referring now to FIGS. 4–6, there is illustrated a tool, generally designated 70, for facilitating installation, i.e., insertion and removal of the adapter section 40 in the radial bore 38. The tool 70 includes an elongated, generally cylindrical tool body 72, preferably formed of steel, having an axis 73 and a head 74 at one end from which projects a pair of pins 76. The pins are on a diameter spaced from the long axis of the tool 70. The head 74 is also provided with a layer of a material 78 which substantially corresponds in softness with the material of the connector 52 and the adapter section. A preferred material for the layer is copper. The opposite end of the tool 70 includes a driving head 80 to which a driving tool, not shown, may be applied. For example, the driving head 80, as illustrated in FIG. 5, may have a plurality of flat surfaces 82 along its side forming a multi-faceted driving head to which a wrench may be applied. Alternatively, the driven head 80 may be provided with a diametrically extending opening 84 for insertion of a rod to facilitate rotation of the tool 70 about its long axis. As a further alternative, both the diametrical opening 84 and the hex head 82 may be provided on the driving head end of the tool.

An alternative embodiment of the tool is illustrated in FIGS. 7 and 8. In this embodiment, the tool, generally designated 88, comprises an elongated tool body 90 terminating at one end in four pins 92 projecting from an end face thereof. The pins are arranged to be received in four correspondingly arranged apertures 48 of the adapter section 40. The opposite end of the tool 88 may have a slot 94 for receiving a screwdriver or a bar for rotating the tool about its long axis. Alternatively, a similar driving head may be provided on the opposite end of the tool 88 as provided on the tool 70.

For retrofitting the sectional terminal stud into existing generators, it will be appreciated that the previously employed unitary terminal stud is unthreaded from the bore copper. During refurbishing, typically the end cap and field windings are removed whereby access to the terminal stud and its removal can be facilitated. For both original equipment manufacture and a retrofit using the sectional terminal stud, it will be appreciated that the radial bore is clear. To insert the adapter section 40, the end of the selected tool, i.e., the end 74 of tool 70 or the end of tool 88 is disposed in the recess 46 of the adapter section in engagement with the electrical connector and with the pins 76 engaged in the apertures 48. The end of the tool is sized to obtain a friction-fit with the electrical connector sufficient such that the weight of the adapter section 40 can be supported on the end of the tool. The adapter section 40 carried by the tool 70 or 90 is then inserted into the radial bore 38 and screwthreaded into the female threads 32 of the bore copper 22. It will be appreciated that it is desirable to insert the adapter section without galling, e.g., scarring or marring the soft copper material of the electrical connector, the adapter section and particularly without interrupting the male threads which are silver-plated to afford a good electrical connection with the bore copper. The tools 70 and 90 enable arcuate guidance of the adapter section through the radial bore 38. With the adapter section aligned in the aperture of the bore copper, a driving tool is supplied to the opposite end of the tool to thread the adapter section into the bore copper. When the adapter section is torqued down, the tool can be withdrawn from the recess 46 of the adapter section and from the bore 38. Next, the outer section 42 of the sectional terminal stud is inserted into the radial bore with its inner end being received in the recess and engaging in a close, tight fit with the electrical connector 52 to effect a good electrical connection therewith and with the adapter section. The remaining portions of the generator are assembled and it will be appreciated that the sectional terminal stud affords an electrical connection between the bore copper and the field windings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of inserting a stud adapter section of a sectional terminal stud into the radial bore of a dynamo-electric machine having a rotor, a bore connector extending generally in an axial direction along a portion of said rotor and having a generally radially outwardly opening aperture, the sectional terminal stud including an outer section, said stud adapter section having a male projection at one end and a recess at an opposite end and a flexible electrical connector in said recess, comprising the steps of:

(a) disposing an end of an elongated tool into said recess into engagement with the electrical connector to frictionally retain said stud adapter section on the end of said tool;

(b) inserting the stud adapter section into the radial bore of the rotor to engage the male projection thereof in the aperture of said bore connector; and (c) withdrawing the tool from within the recess of the stud adapter section and the radial bore, leaving the stud adapter section engaged with the bore connector.

2. A method according to claim 1 wherein the male projection of the stud adapter section is threaded at one end, said stud adapter section including a pair of apertures in said recess adjacent an opposite end thereof, the aperture of the bore connector being threaded, including engaging a pair of pins on the end of the tool in the apertures in the recess of the stud adapter section and rotating the tool to thread the stud adapter section into the threaded aperture of the bore connector.

3. A method according to claim 1 including, subsequent to step (c), inserting an end of the outer section of the terminal stud adapter section into the recess of the stud adapter section for electrical connection with the electrical connector.

4. A method according to claim 1 including retrofitting a generator having a terminal stud disposed in the radial bore of the generator, by, prior to step (a), removing the terminal stud from the radial bore, followed by performing steps (a)–(c).

5. A method according to claim 4 wherein the aperture of the bore connector has female threads and an end of the sectional terminal stud and the male projection of the stud adapter section have male threads and including the steps of, prior to step (a), unthreading the sectional terminal stud from the bore connector and wherein the step of inserting includes threading the stud adapter section into the bore connector aperture to establish an electrical connection therebetween.

* * * * *

UNITED STATES PATENT AND TRADEMARK OFFICE
CERTIFICATE OF CORRECTION

PATENT NO. : 6,453,540 B1
DATED : September 24, 2002
INVENTOR(S) : Blakelock et al.

It is certified that error appears in the above-identified patent and that said Letters Patent is hereby corrected as shown below:

Title page,
Item [54], change the title to -- A METHOD FOR THE INSTALLATION OF A TERMINAL STUD ADAPTER IN A GENERATOR ROTOR --.

Column 3,
Line 6, change "tool.are" to -- tool are --.

Column 4,
Line 60, change "portion 59. of" to -- portion 59 of --.

Signed and Sealed this

Eleventh Day of February, 2003

JAMES E. ROGAN
*Director of the United States Patent and Trademark Office*